United States Patent [19]
Tien Lin

[11] Patent Number: 6,164,190
[45] Date of Patent: Dec. 26, 2000

[54] TEA INFUSING DEVICE

[76] Inventor: Yu Mei Tien Lin, 4F, No. 24, Lane 4, Alley 345, Section 4, Jen Ai Rd., Taipei, Taiwan

[21] Appl. No.: 09/464,476

[22] Filed: Dec. 16, 1999

[51] Int. Cl.$^7$ ........................................................ A47J 31/02
[52] U.S. Cl. .................................. 99/299; 99/306; 99/323
[58] Field of Search .............................. 99/299, 304, 306, 99/317, 323, 279; 210/474, 477, 478, 479, 181

[56] References Cited

U.S. PATENT DOCUMENTS 5,813,317  9/1998  Chang ..................................... 99/299 X

*Primary Examiner*—Reginald L. Alexander
*Attorney, Agent, or Firm*—Rosenberg, Klein & Lee

[57] ABSTRACT

A tea infusing device comprises a cup body, a filtering net, a buckling disk, and a water stopping device. The water stopping device is received in the center through hole of the cup body, and is formed by a metal rolling ball and a soft water stopping pad, or a water stopping block and a rod. A filtering net is installed thereon. A circular protruding ring portion with a proper height extends downwards from the bottom of the cup body. The buckling disk has a rod at the center thereof and is movable upwards and downwards. When the tea infusing device is arranged on a plane, the buckling disk will drop down naturally so that the water stopping device will close a through hole. Thus, the tea can be soaked in the cup. However, when the tea infusing device is located at any proper container. The buckling disk will be ejected by the container to eject the water stopping device so that tea water may flow to the container successfully. The improvement of the present invention is that the outer diameter of the buckling disk is smaller than the inner diameter of the protruding ring portion so that it can be completely received in the inner space thereof and longitudinally moves therein. Thus, water will not drain out due to an error contact to the buckling disk.

15 Claims, 16 Drawing Sheets

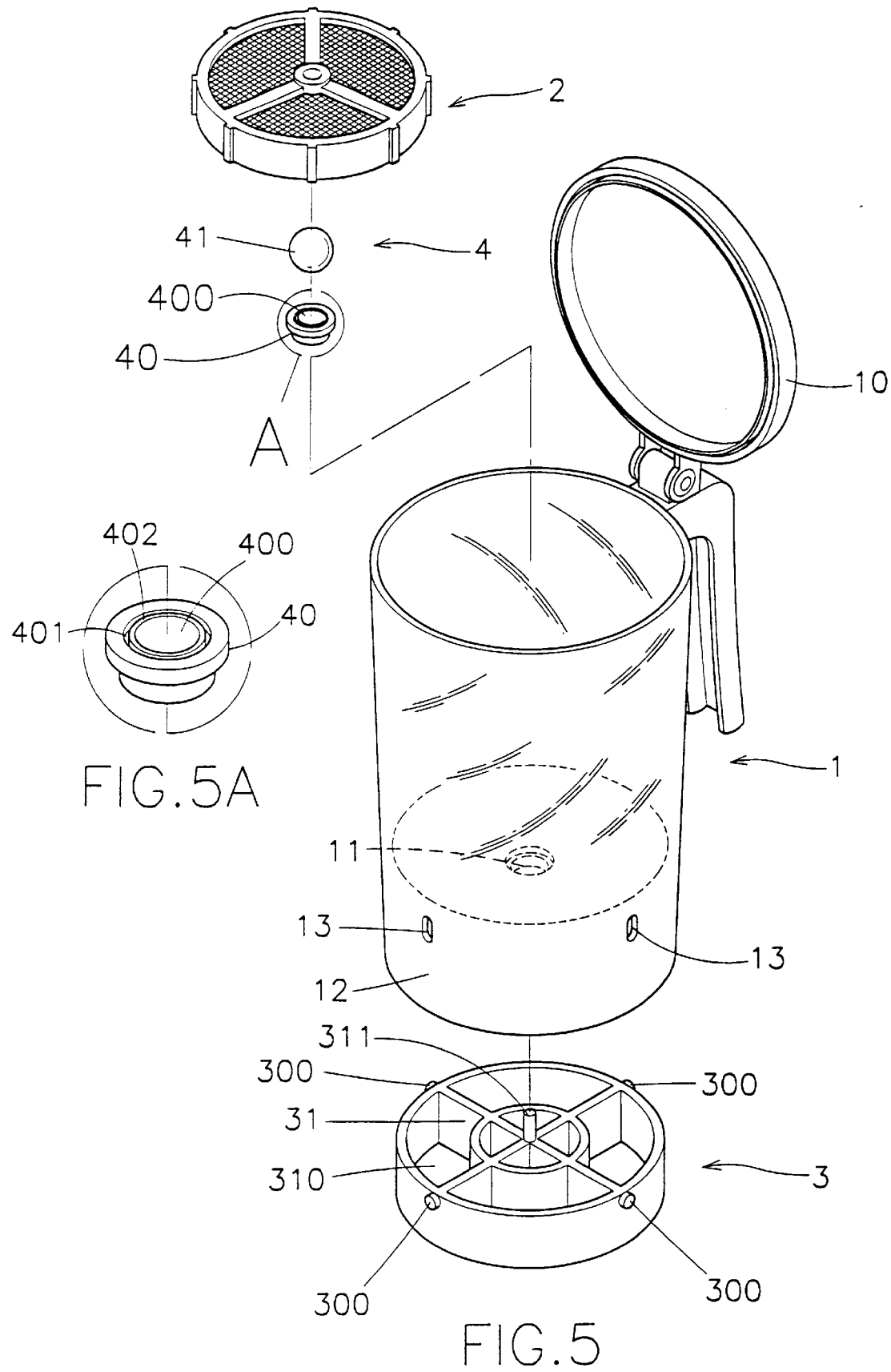

TEA INFUSING DEVICE

FIELD OF THE INVENTION

The present invention relates to a tea infusing device, especially to a tea infusing device for making tea and the dreg therein can be filtered out from water, which is suitable for containers of various sizes and is easily operated.

BACKGROUND OF THE INVENTION

Conventionally, in making tea, tea is firstly filled into a container, then adding hot water into the container. After several minutes, the tea water can be drunken. However, the tea and water are not separated properly. Therefore, it is possible that tea dreg is drunken by the user. Furthermore, the tealeaves still remain in the container, thus the density becomes larger and larger, and dregs are increased. The fragrant odor of the tea will disappear. Therefore, some novel designs are invented, which may separate tea with water. Wherein in one structure, the tea infusing device contains an inner cup and an outer cup. A through hole and a rolling ball are installed on the center of the cup bottom, and a filtering net is installed therein. A linkage is further connected to one side of the inner cup and the through hole. The user may infuse tea in the inner cup and then press the linkage for ejecting the rolling ball. The tea can be filtered by the filtering net, and then is drained to the outer cup at the lower side, thus the water without tea dregs are obtained. However, in such kinds of structure, the rolling ball is rolled between the bottom of the inner cup and the filtering net without any confinement. Moreover, a gap is easily formed between the rolling ball and the through hole, when the cup is inclined and tea water is desired to be poured out, the rolling ball will roll out of the through hole so that the water drains out improperly. Furthermore, it is possible that water will drain out drop by drop. Besides, the inner cup and outer cup are used in pairs. Therefore, when the upper half space of the outer cup is occupied by the inner cup, the space for containing water is limited so that it can not be used in other container.

Therefore, in order to solve such problem, the inventor of the present invention has invented a special tea infusing device for resolving aforesaid problem and disclosed novel tea infusing devices, such as that disclosed in Taiwan Patent Publication No. 09/324108, "INDUSION COFFEE MAKER", file in Oct. 27, 1998, and Taiwan Patent Application No. 09/324108, "IMPROVEMENT STRUCTURE OF A TEA FLUSHING DEVICE", filed in Jun. 2, 1999. In the two patents, a protruding ring portion is installed at bottom of a cup. A plurality of vertical long holes are symmetrically installed at the protruding ring portion. A leg plate extends from each long hole. A buckling disk is prepared. A ring with a diameter smaller than that of the protruding ring portion and having a symmetric outer periphery is formed. A through hole with respect to the leg plate is installed on the buckling disk adjacent to the ring. The buckling disk can pass through the long hole by a buckling post, and leg plate can insert into the through hole so that the buckling disk can longitudinal move in the cup. A water stopping device capable of being inserted into the central through hole at the bottom of the cup and capable of sealing or opening the through hole at proper time is installed on the center of the buckling disk. Therefore, when the cup is flatly arranged on a plane by the leg plates, the buckling disk will descend by the weight thereof so that the water stopping device will seal the through hole for stopping water. The user only needs to locate the cup in any container with a diameter smaller than that of the buckling disk, the buckling disk will be ejected by the container so that the water stopping device separate with the through hole. Thus, the water (or coffee) within the cup flows to the container successfully. Thus use of these prior art is convenient.

In normal use, the novel tea infusing device has a good effect. However, when it is used with containers with different sizes. The diameter of the buckling disk is generally larger than that of outer edge of the protruding ring portion at cup bottom, thus it is possible to be contacted by the user or other objects. Therefore, the water stopping device is ejected to separate with the through hole slightly so that a little water drains out.

SUMMARY OF THE INVENTION

Accordingly, the primary object of the present invention is to provide a tea infusing device, wherein an error contact is effectively prevented. The buckling disk is completely hidden within the protruding ring portion at the bottom of the cup. Therefore, even the cup is flatly arranged so that the buckling disk drops down due to Gravitational force, the buckling disk will not protrude out of the protruding ring portion. As a result, it will not contact with the user or other objects.

The various objects and advantages of the present invention will be more readily understood from the following detailed description when read in conjunction with the appended drawing.

BRIEF DESCRIPTION OF THE DRAWINGS

FIG. 5 is an exploded perspective view showing the structure of second embodiment according to the present invention.

FIG. 5A is a enlarged perspective view of the stopping pad.

DETAILED DESCRIPTION OF THE PREFERRED EMBODIMENT

Figure 1:
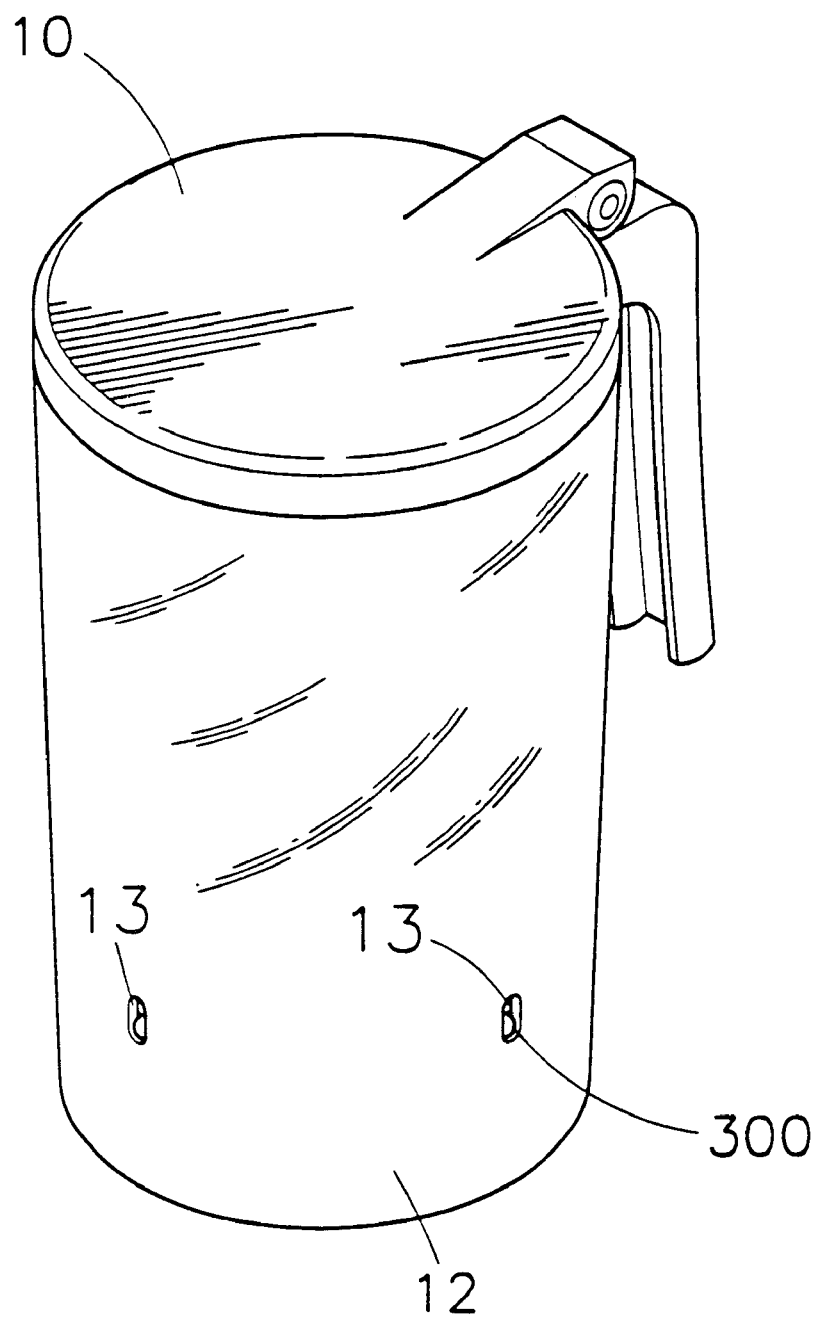
FIG. 1 shows the perspective view of the structure in the present invention.
Figure 2:
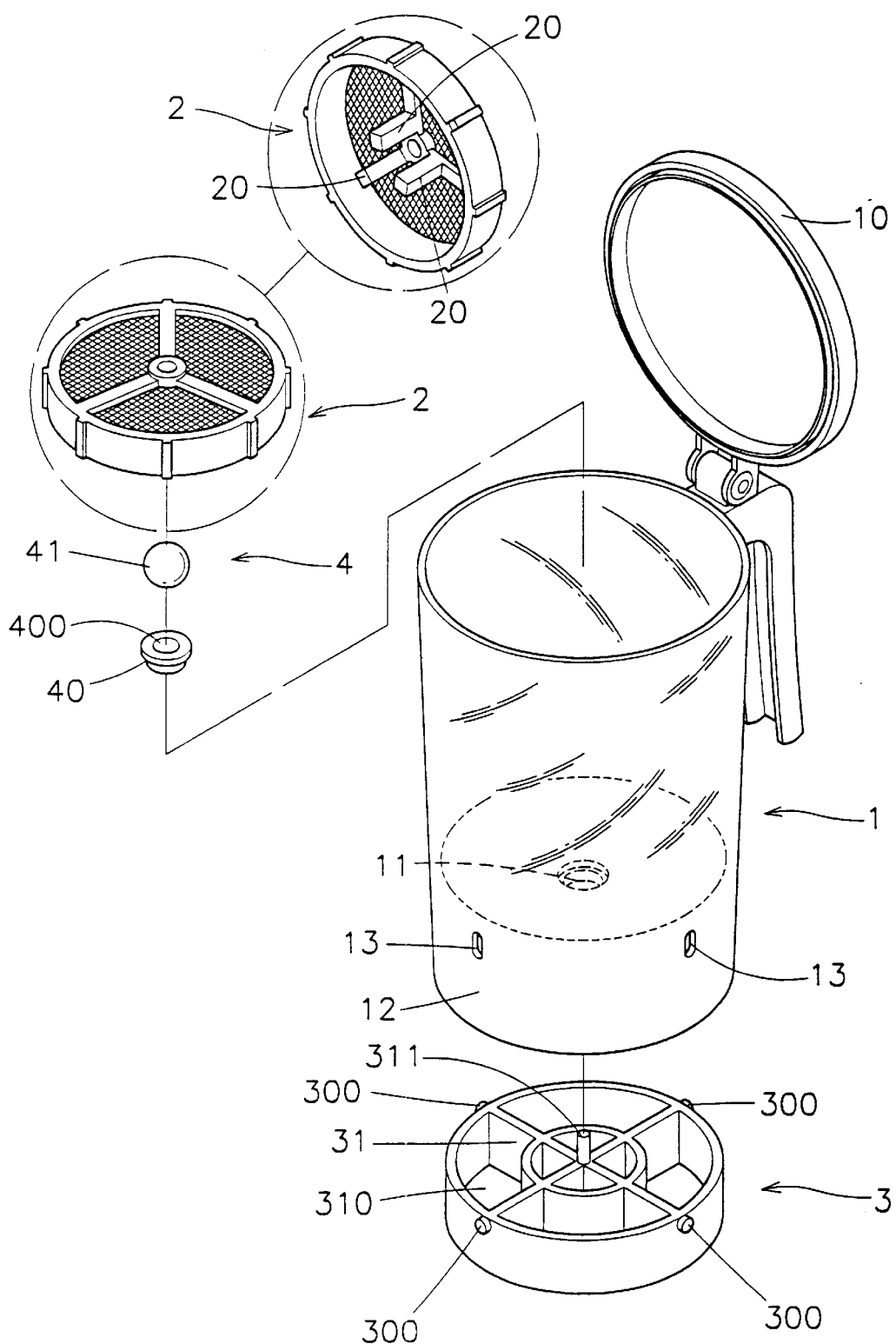
FIG. 2 is an exploded perspective view of the first embodiment in the present invention.

With reference to FIGS. 1 and 2, the exploded perspective view and the assembly view about the preferred embodiment of the tea infusing device according to the present invention is illustrated. The tea infusing device includes a cup body 1, a filtering net 2, a buckling disk 3 and a water stopping device 4.

The cup body 1 has a cup cover 10. The bottom of the cup has a tapered inclined surface. The center thereof is installed with a through hole 11. A circular protruding ring portion with a proper height, closed completely and having openings of proper number is extended from the periphery of the bottom of the cup. The openings are almost closed. A plurality of symmetric long holes 13 can be installed at the wall of the protruding ring portion. A plurality of small convex block beneficial for locating the cup are selectively installed at the bottom of the protruding ring portion.

The filtering net 2 is installed above the bottom of the cup body 1 so to isolate the through hole 11.

The buckling disk 3 has an outer diameter slightly smaller than the inner diameter of the protruding ring, portion 12 of the cup body 1 and has a height smaller than the that of the protruding ring portion. The space enclosed by the protruding ring portion 12 is adjustable. A plurality of symmetrical buckling posts 300 are installed at the wall at the periphery of the buckling disk 3 so that they can be inserted into the respective long holes of the protruding ring portion 12. Thus, the buckling disk 3 is movable upwards or downwards with the cup body. Even it is descended to a lowest position, it will not protrude out of the protruding ring portion 12. A plurality of fixing ribs 31 are installed on the buckling disk 3 so as to formed as a plurality of through holes. A rod 311 is installed at the center of the disk, which may pass through the through hole 11.

Figure 3:
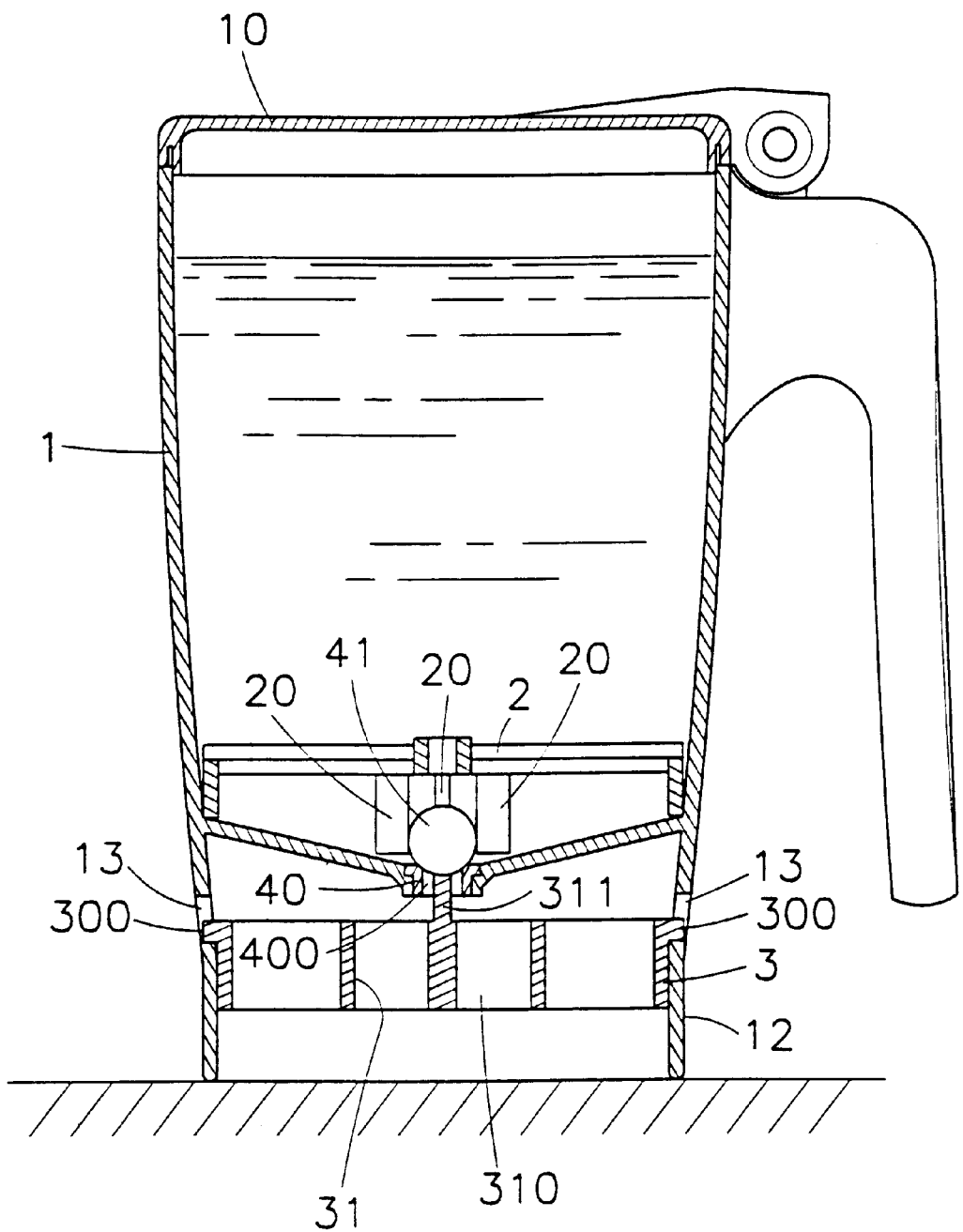
FIG. 3 is a lateral cross sectional view schematically showing in the water stopping state, the structure of the first embodiment being flatly arranged on a plane.
Figure 4:
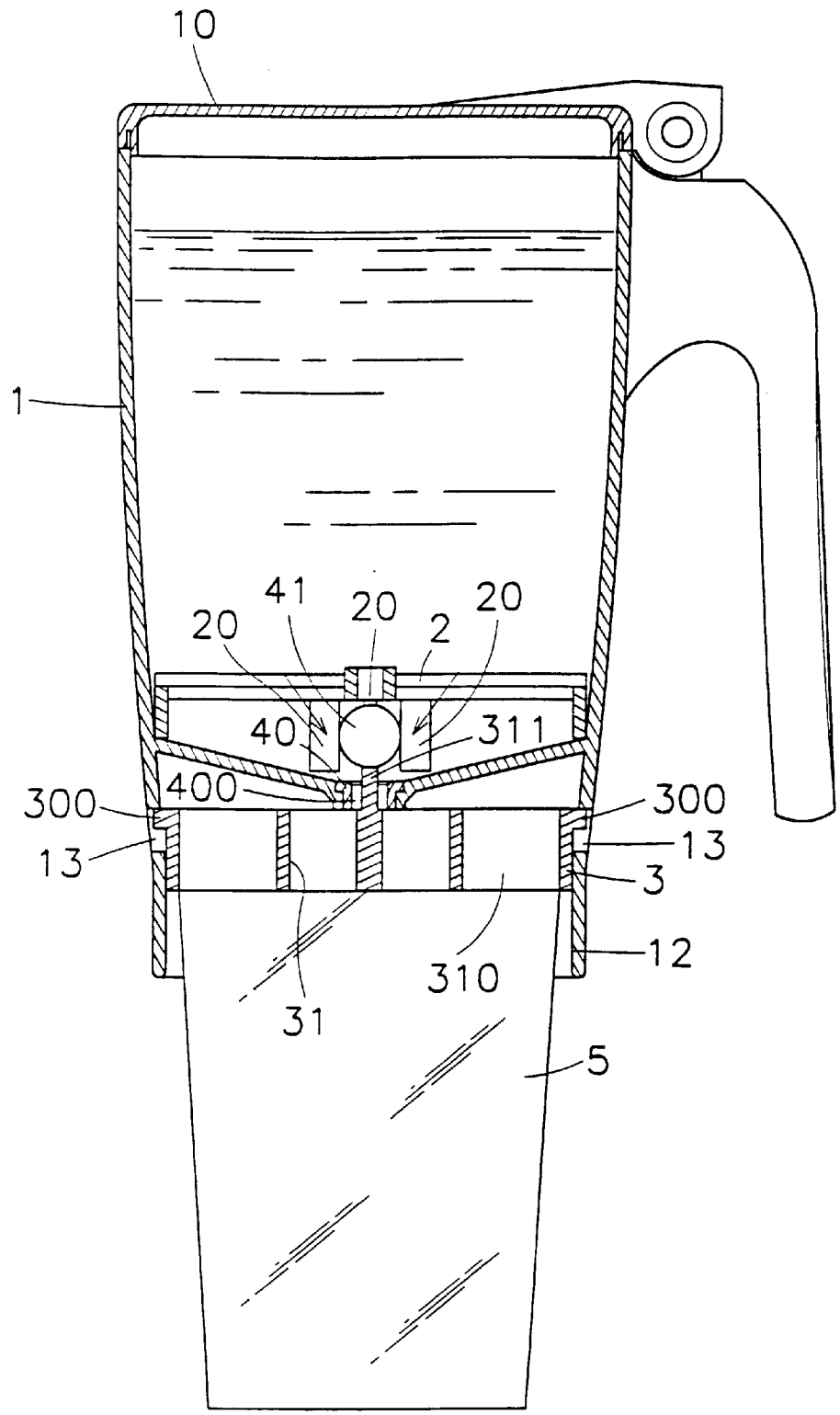
FIG. 4 is a lateral cross sectional view schematically showing that in a water releasing state, the structure of first embodiment in the present invention is located in a container with a properly large diameter.
Figure 4A:
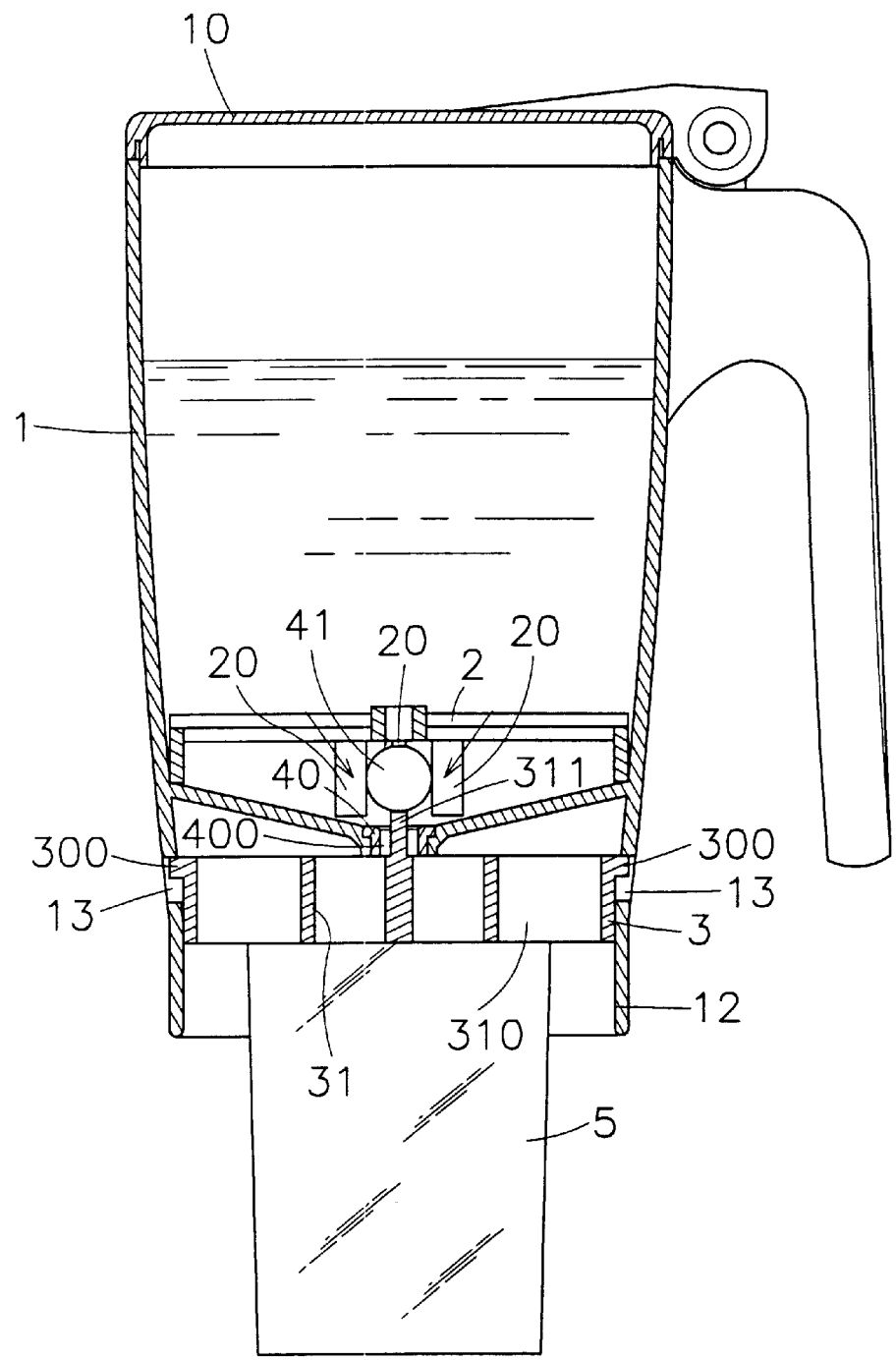
FIG. 4A is a lateral cross sectional view schematically showing that in a water releasing state, the structure of first embodiment in the present invention is located in a container with a properly small diameter.

In application, the water stopping device 4 may include a soft and flexible rubber water stopping pad 40 and a metal rolling ball 41. The water stopping pad 40 is installed in the through hole 11 at bottom of the cup. The metal rolling ball 41 is arranged on the water stopping pad 40. A positioning body 20 are extended downwards from the filtering net 2 for enclosing the rolling ball 41. As shown in FIGS. 3 and 4, the positioning body may have a form of a plurality of symmetrically radiating posts, or a plurality of ribs, or a round barrel for forming a region exactly enclosing the rolling ball 41 so to confine the lateral movement of the rolling ball 41.

By aforesaid components, a tea infusing device shown in FIG. 1 can be formed. As shown in FIG. 3, when the cup is placed on the plane, such as table surface, and tea and hot water are added to the cup. By the supporting of the protruding ring portion 12, due to gravitational force, the buckling disk 3 will slide downwards along the long hole 13 by the buckling post so that the rod 311 is compressed downwards from the through hole 400 of the water stopping pad 40. Thus, the rolling ball 41 will press the water stopping pad 40 by the weight itself and water pressure in order to tightly lock the through hole 400. Therefore, water is sealed tightly and tea can be soaked within water. When tea water is desired to be taken out for drinking, as shown in FIG. 4, the user only needs to located the cup in any container with a diameter smaller than the inner diameter of the protruding ring portion 12 (such as the container 5 with a large diameter shown in FIG. 5, or the container 5 with a smaller diameter shown in FIG. 4). Then the container 5 will is used to eject the buckling disk 3 so that the cup 1 may descend by the weight itself. Thus, the central rod 311 of the buckling disk 3 will eject the rolling ball 41 to separate with the through hole 400 of the water stopping pad 40. Therefore, the tea water in the cup 1 will be poured out successfully to the container. Now, the tea and dregs are isolated by the filtering net and do not flow out with the water. Therefore, delicious tea water is obtained. The operation of the present invention is easy, only an action of placing is necessary.

It should be appreciated that despite of descending by gravitational force or due to being ejected by other container 5, the buckling disk 3 moves upwards or downwards within the space enclosed by the protruding ring portion 12 as shown in FIG. 1, namely, no structure protrudes out of the protruding ring portion 12. Therefore, the buckling disk is impossible to be contacted with the lateral side or outer objects due to a mistake action. As a result, the rolling ball 41 will not be ejected to cause the water drains out. Therefore, the safety of the tea infusing device is sustained.

Besides, since the tea infusing device is separated with the container 5 for containing water, the cup I may separate with the container 5 for being used independently. When the water within the container 5 is poured out, the container can be taken out without needing to be inclined with the cup. Therefore, it is difficult to vibrate the water stopping device 4. Especially, since the rolling ball 4 is confined by the plurality of positioning body 20 below the filtering net 2, therefore, it is more easily to be positioned without rolling anywhere. A good water sealing is sustained.

Figures 6, 6A:
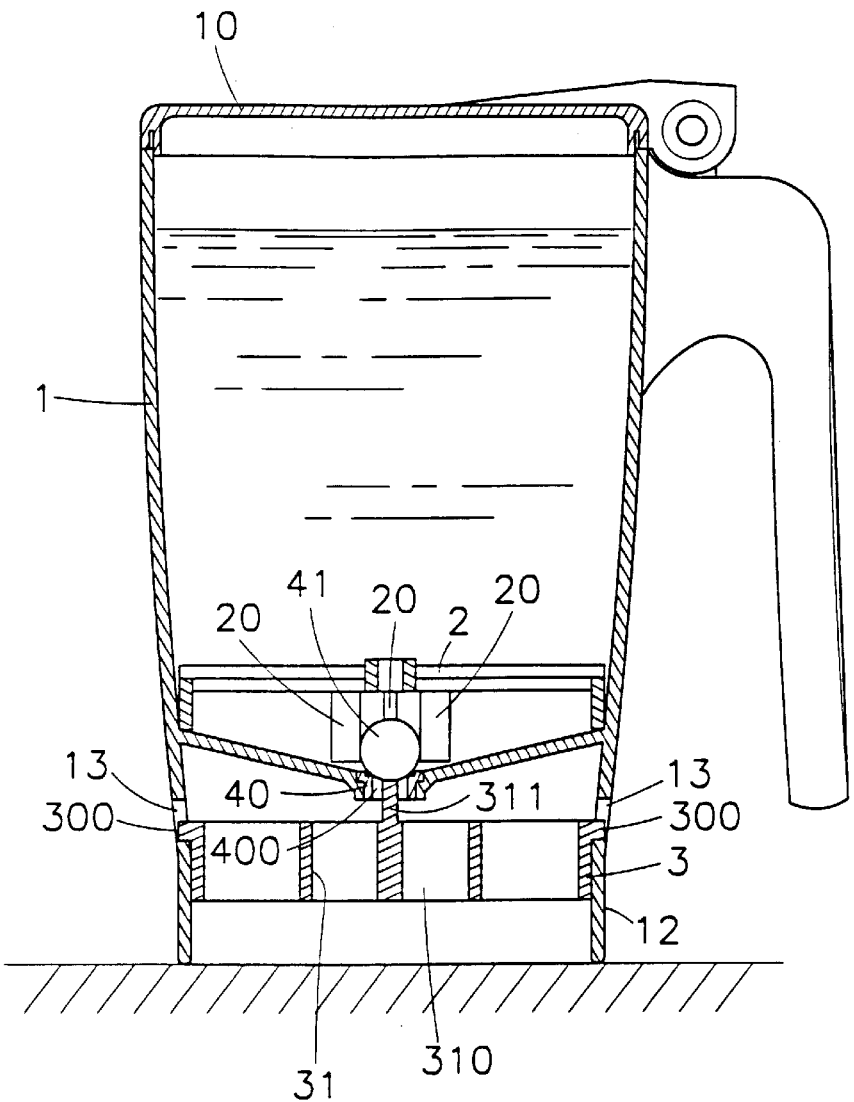
FIG. 6 is a lateral cross sectional view schematically showing in the water stopping state, the structure of the second embodiment being flatly arranged on a plane.
FIG. 6A is a partially enlarged view showing the water stopping device of FIG. 6.
Figures 7, 7A:
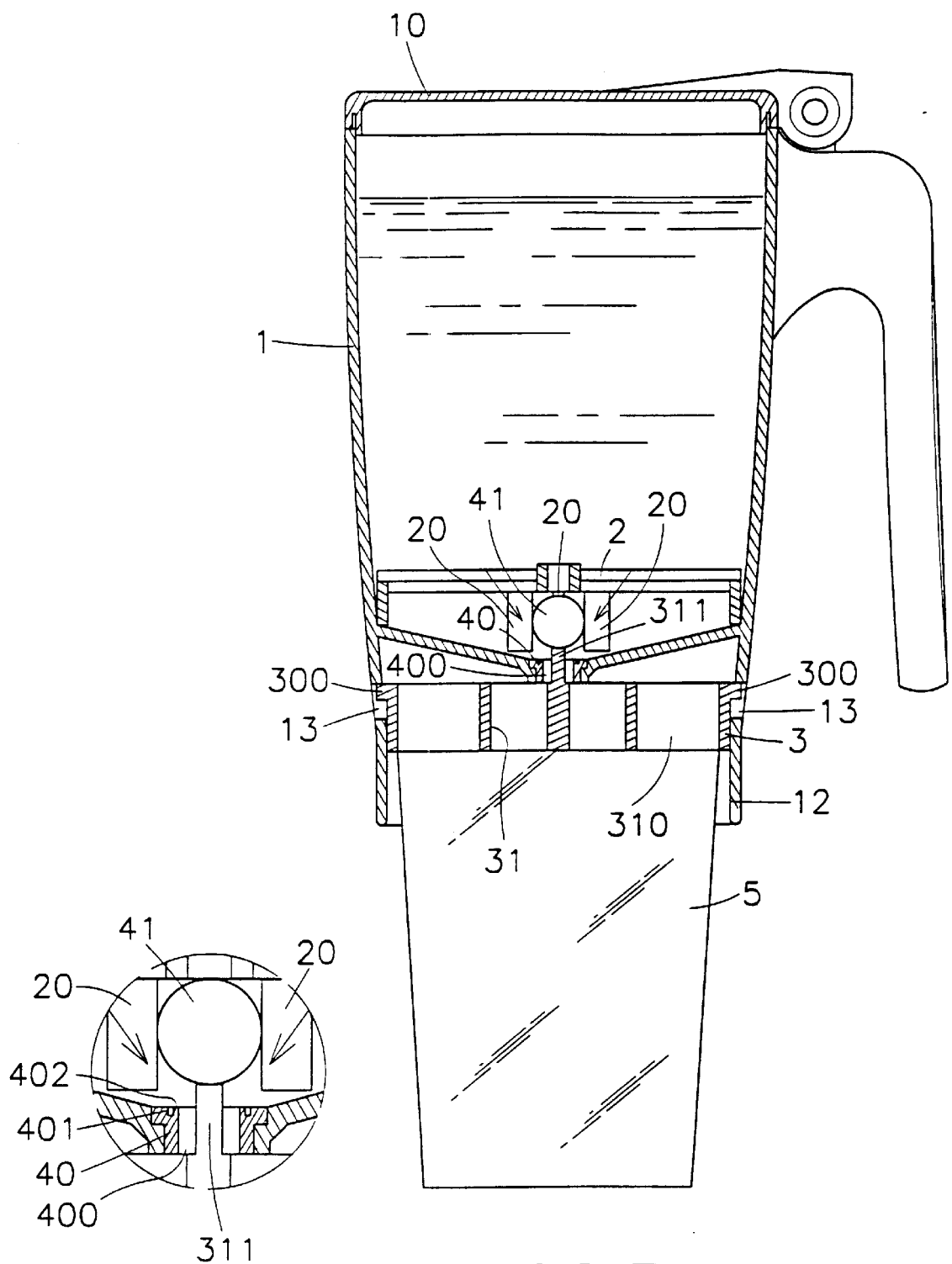
FIG. 7 is a lateral cross sectional view schematically showing that in a water releasing state, the structure of second embodiment in the present invention is located in a container with a properly large diameter.
Figure 8:
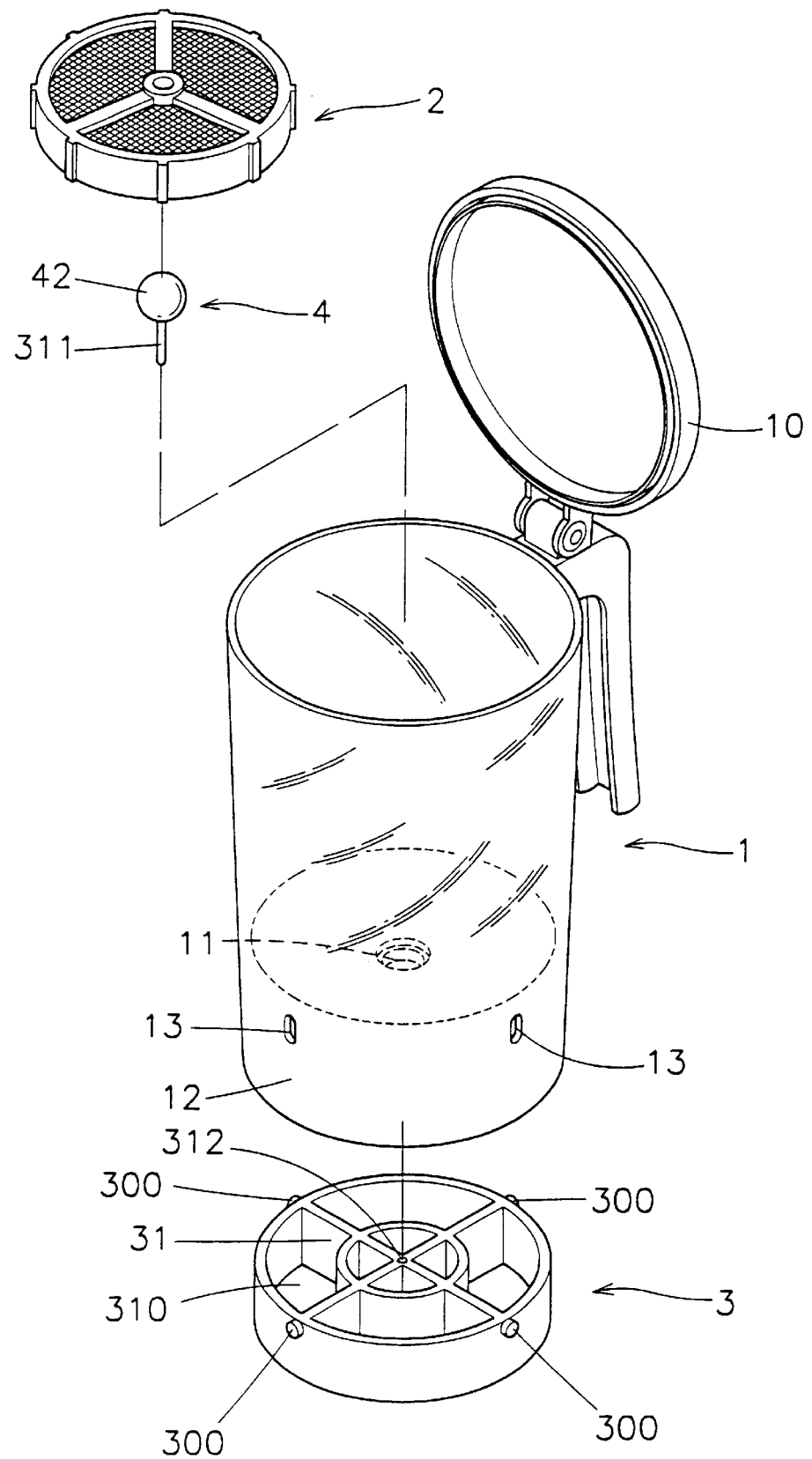
FIG. 8 is an exploded perspective view showing the structure of the third embodiment in the present invention.
Figure 9:
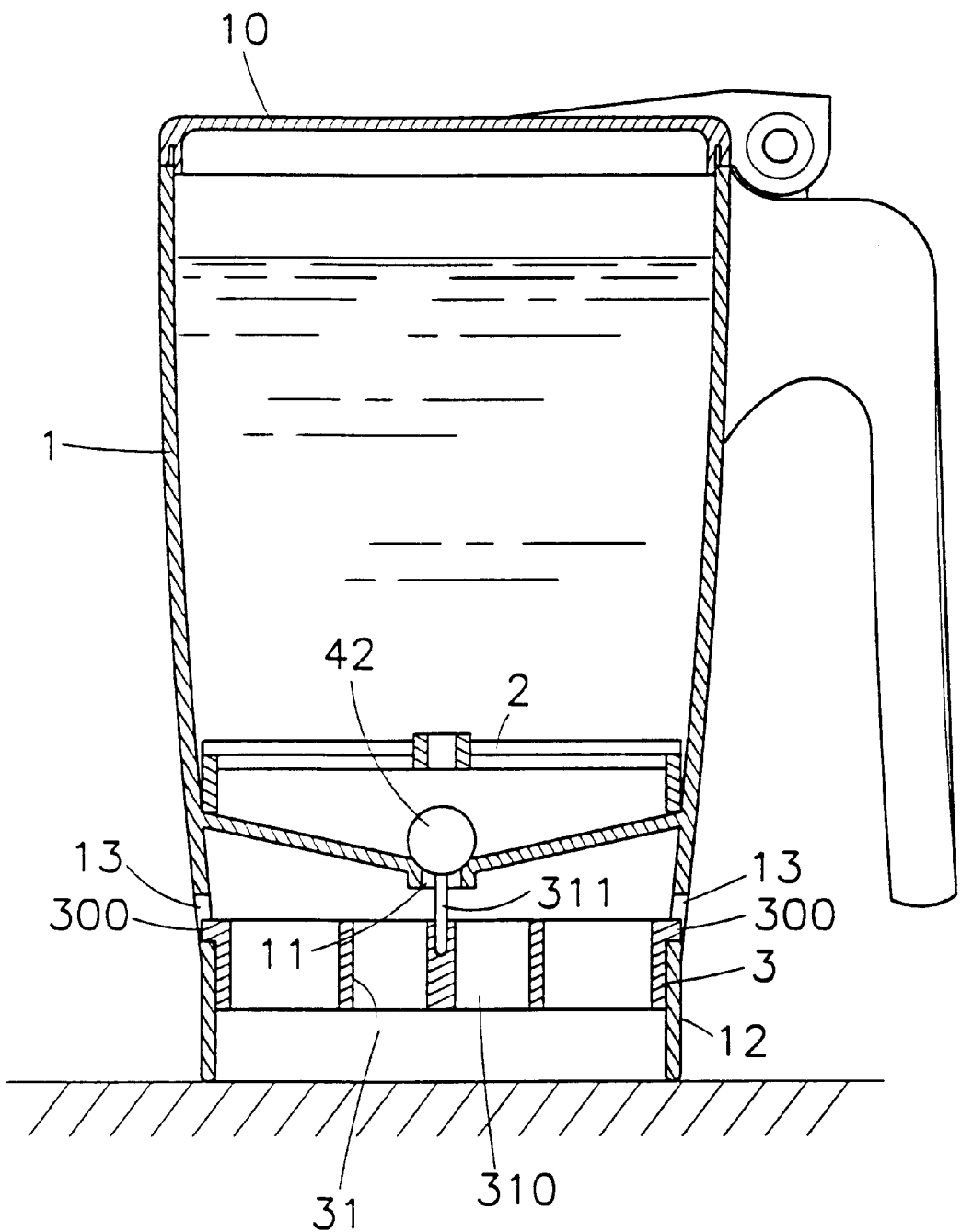
FIG. 9 is a lateral cross sectional view schematically showing in the water stopping state, the structure of the third embodiment being flatly arranged on a plane.
Figure 10:
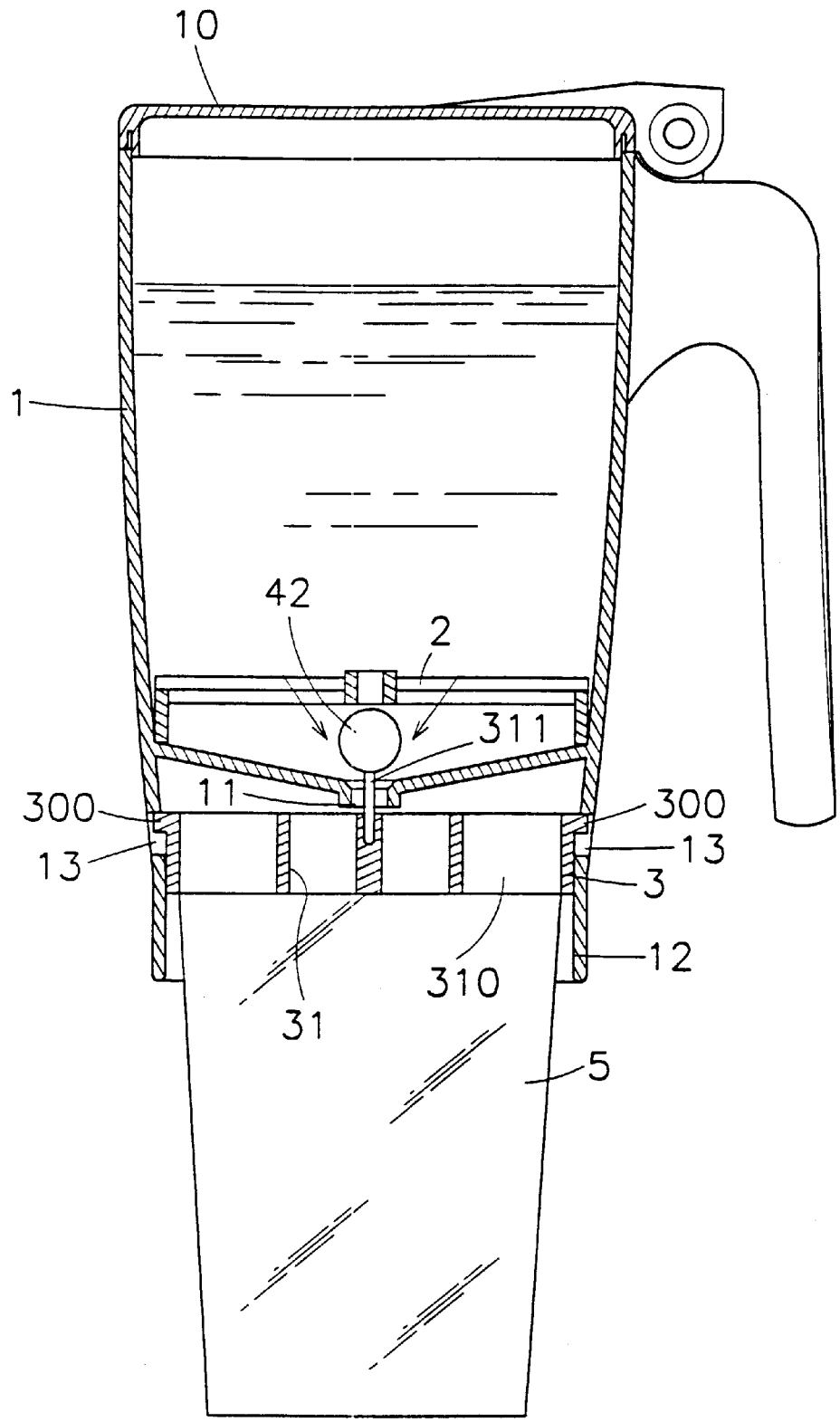
FIG. 10 is a lateral cross sectional view schematically showing that in a water releasing state, the structure of third embodiment in the present invention is located in a container with a properly large diameter.
Figure 11:
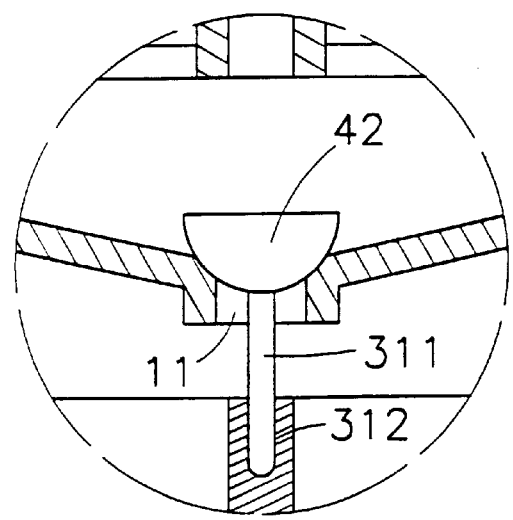
FIG. 11 is a partial structural view schematically showing the water stopping device of the third embodiment in another application.
Figure 12:
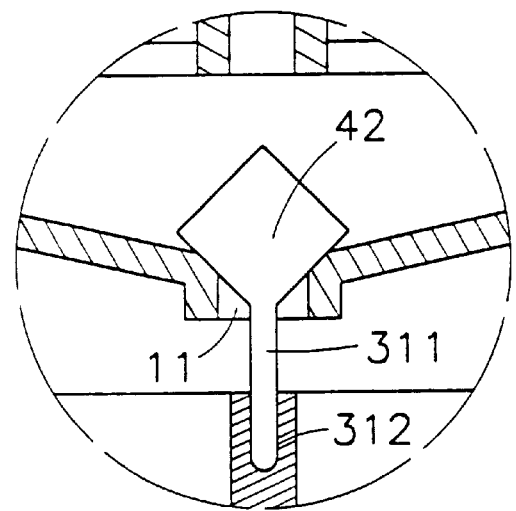
FIG. 12 is a partial structural view schematically showing the water stopping device of the third embodiment in a further application.
Figure 13:
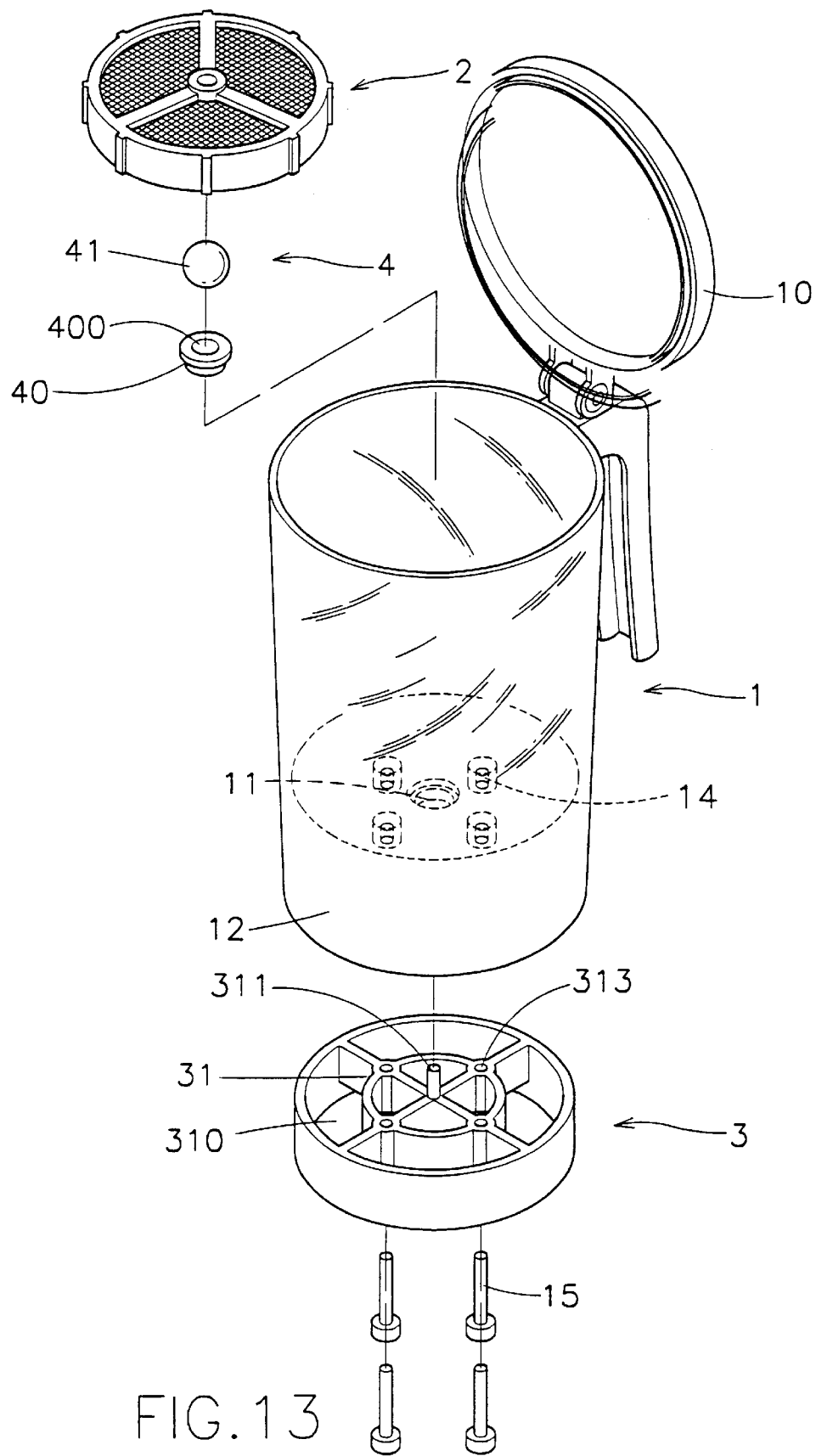
FIG. 13 is an exploded perspective view showing the structure of the fourth embodiment in the present invention.

Moreover, as the second embodiment shown in FIGS. 4 and 5, a circular trench 401 can be further installed in the water stopping pad 40 of the water stopping device 4 at a place adjacent to the top of the rolling ball 41 and near the periphery of the central through hole 400 so as to form a water stopping ring 402 with a thin width. As shown in FIGS. 6 and 6A, when it is pressed by the rolling ball 41 or water pressure, a larger deformation will be formed so as to tight resist against the rolling ball 41. Therefore, the gap due to an fault size matching is compensated. Thus, preferred water sealing is obtained. The lifting of the buckling disk 3 is shown in FIGS. 7 and 7A. FIG. 8 shows the third embodiment of the water stopping device in the present invention. The water stopping device is formed by a water stopping block with a ball shape shown in the figure or a hemisphere shape shown in FIG,. 11 or a taper shape shown in FIG. 12 to be connected to the rod 311 at the center of the bottom of the water stopping block 42. A concave hole 412 is installed at the center of the buckling disk 3, which may be connected to the rod 311. Since the water stopping device 4 has an inserting through hole 11 and a rod 311. Thus, it will not separate with the through hole 11 due to inclination or vibration as shown in FIGS. 9 and 10. Thus, the water stopping device 4 is steadily positioned in the through hole 11 to retain a preferred water stopping effect.

Figure 14:
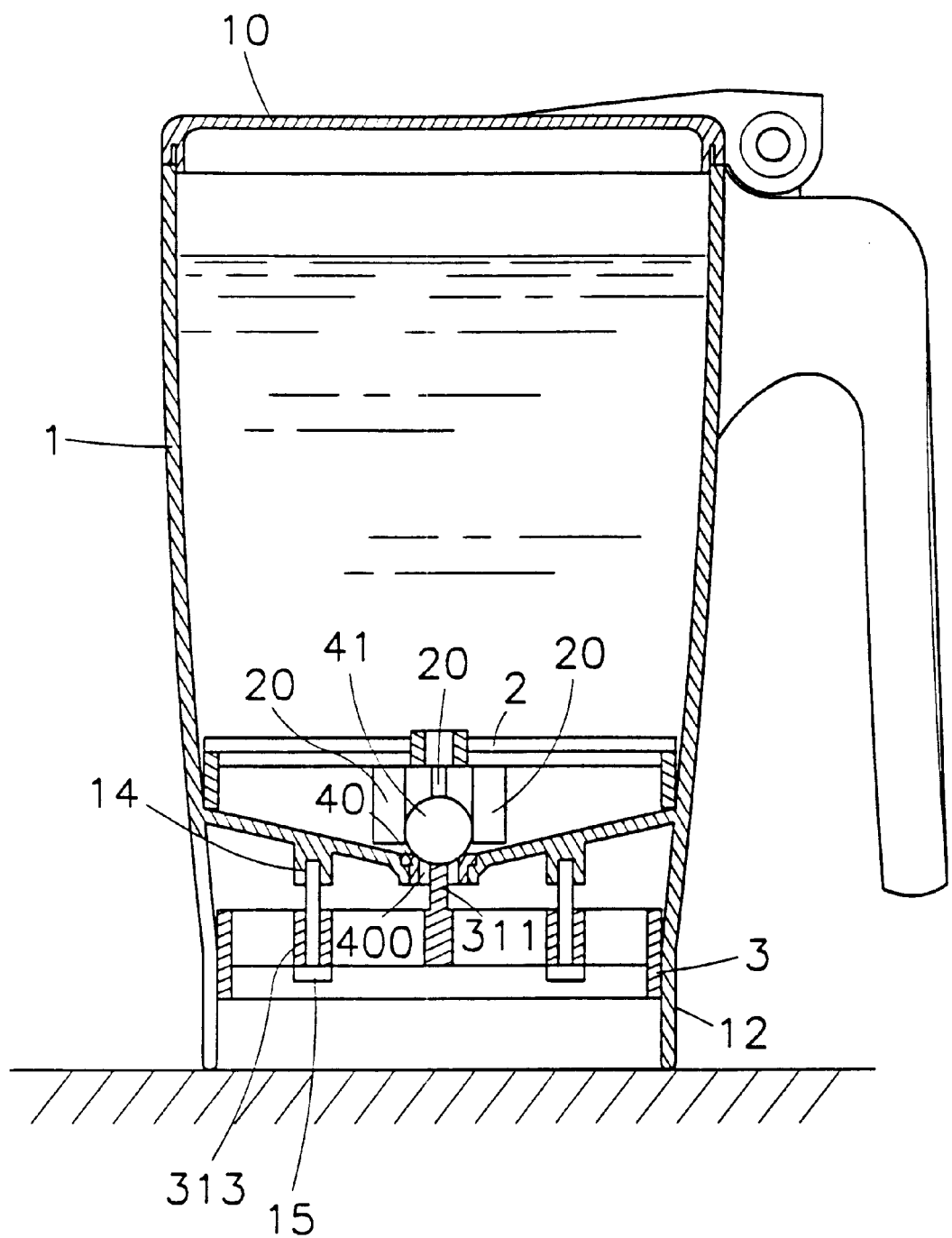
FIG. 14 is a lateral cross sectional view schematically showing in the water stopping state, the structure of the fourth embodiment being flatly arranged on a plane.
Figure 15:
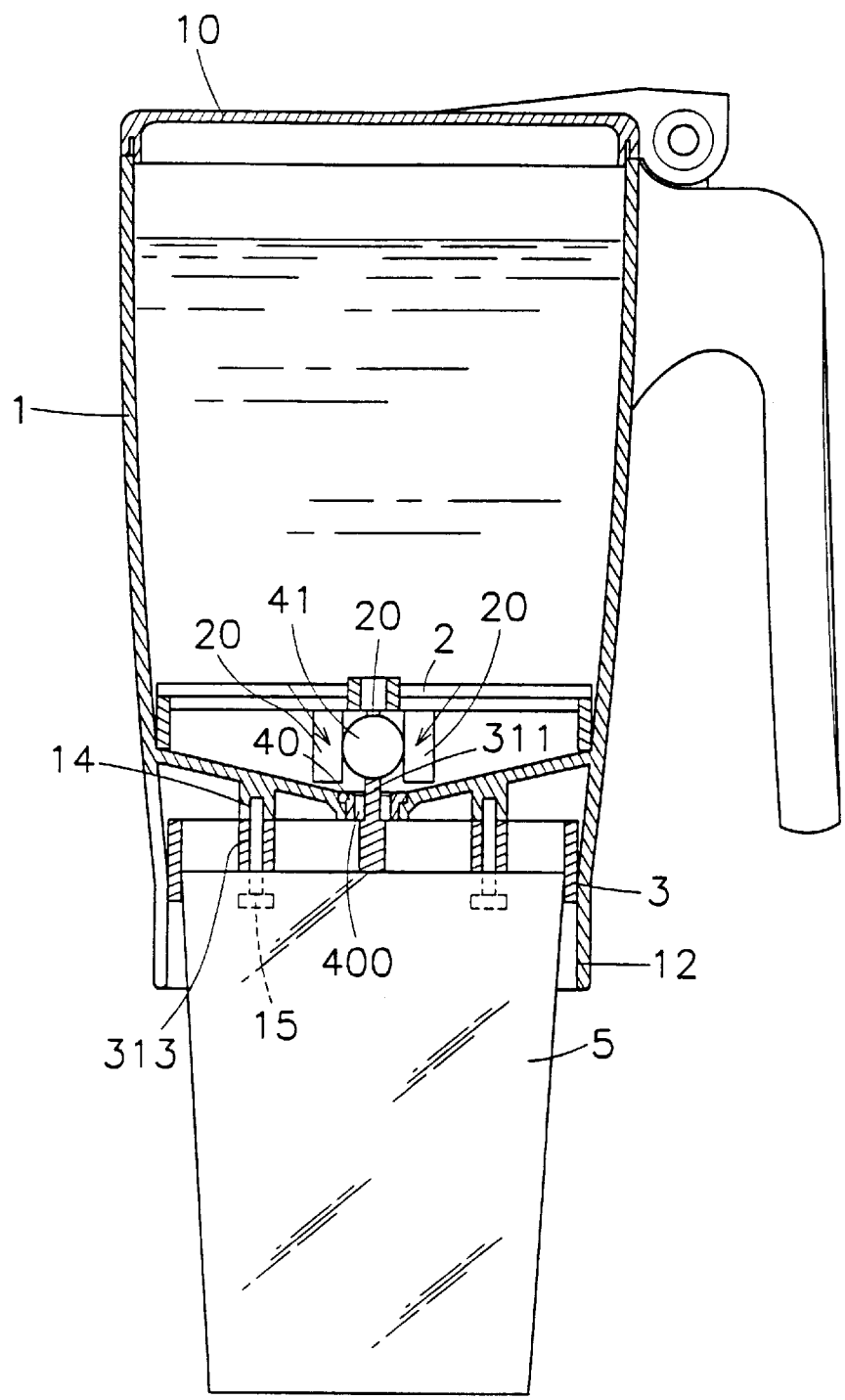
FIG. 15 is a lateral cross sectional view schematically showing that in a water releasing state, the structure of fourth embodiment in the present invention is located in a container with a properly large diameter.
Figure 16:
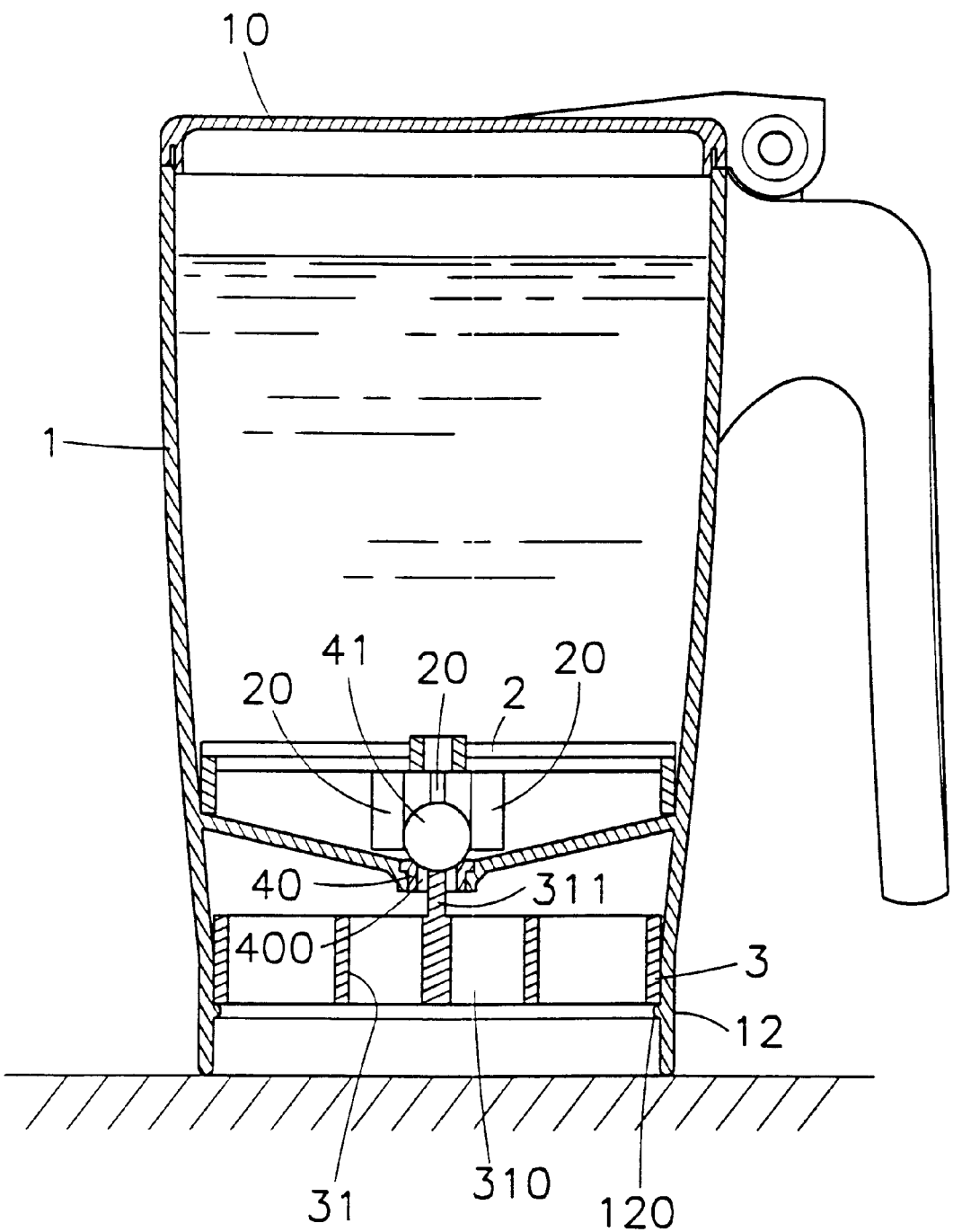
FIG. 16 is a lateral cross sectional view schematically showing in the water stopping state, the structure of the fifth embodiment being flatly arranged on a plane.

Furthermore, the fourth embodiment of the cup body 1 and the buckling disk 3 of the present invention is illustrated. A plurality of penetrating holes 313 and inserting holes 14 are symmetrically installed at the fixing ribs 31 of the buckling disk and the bottom of the cup body 1, respectively. Thereby, a nail rod 15 with a length longer than the height of the fixing rib 31 may pass through the penetrating hole 313 to be firmly secured to the inserting hole 14. Therefore, similarly, the buckling disk 3 may upwards or downwards move with respect to the cup body 1, as shown in FIGS. 14 and 15. Moreover, as shown in FIG. 16, the fifth embodiment of the present invention for confining the traveling length of the buckling disk 3 is illustrated. A round flange 120 is formed at the inner round wall of the protruding ring portion 12 for confining the lower location of the buckling disk 3.

Accordingly, the tea infusing device of the present invention is substantially used to overcome the defect in the prior art, such as water draining due to an error contact.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A tea infusing device comprising:

a cup body having a through hole at the center of the bottom thereof, and a protruding ring portion with a proper height being extended from the periphery of the bottom of the cup body;

a filtering net installed above the bottom of the cup body;

a buckling disk having an outer diameter slightly smaller than the inner diameter of the protruding ring portion so as to be completely hidden in a space enclosed by the protruding ring portion and be movable longitudinally therein; the height of the disk being smaller than the height of the protruding ring portion so that even when the disk descends to a lowest point, it will not protrude out of the lower edge of the protruding ring portion; a plurality of fixing ribs being installed in the buckling disk for forming a plurality of via holes, and a rod capable of being inserted within the center of the disk being installed at the center of the disk;

a water stopping device installed on the through hole at the bottom of the cup body, which can be ejected at a proper time by the rod of the buckling disk; wherein when the whole tea infusing device is flatly arranged on a plane and can be resisted against by the protruding ring portion, the buckling disk therewithin will descend by the gravitational force so that the rod will be pressed downwards to pass thorugh the through hole to drive the water stopping device to seal the through hole; when the tea infusing device is placed in a container having an opening with the diameter smaller than the inner diameter of the rod, the buckling disk will be ejected by the container so that the water stopping device is ejected to separate from the through hole by the rod.

2. The tea infusing device as claimed in claim 1, wherein the protruding ring portion at the bottom of the cup body is a completely closing circular ring.

3. The tea infusing device as claimed in claim 1, wherein the protruding ring portion at the bottom of the cup body is an approximate closing ring with grooves.

4. The tea infusing device as claimed in claim 1, wherein long holes are installed at the periphery of the protruding ring portion at the bottom of the cup body, while a plurality of buckling posts capable of buckling into the long holes are installed at the periphery of the buckling disk so that the buckling disk can move upwards or downwards with respect to the cup body and is installed within the protruding ring portion.

5. The tea infusing device as claimed in claim 1, wherein each of fixing ribs of the buckling disk is formed with a penetrating hole, the bottom of the cup body is installed with inserting holes at positions with respect to the penetrating holes; by nail rods to pass through the penetrating holes and then be firmly securely to the inserting holes, the buckling disk is installed within the protruding ring portion and is movable upwards or downwards with respect to the cup body.

6. The tea infusing device as claimed in claim 1, wherein the water stopping device includes a soft and telescopic water stopping pad installed at the through hole of the bottom of the cup and a rolling ball arranged above the central through hole of the water stopping pad.

7. The tea infusing device as claimed in claim 6, wherein a circular trench is further installed in the water stopping pad of the water stopping device at the place adjacent to the top of the rolling ball and near the periphery of the central through hole so as to form with a water stopping ring having a thin width.

8. The tea infusing device as claimed in claim 6, wherein a proper positioning body for enclosing the rolling ball extends from the bottom of the filtering net.

9. The tea infusing device as claimed in claim 8, wherein the positioning body is a plurality of posts extending as a radiating shape.

10. The tea infusing device as claimed in claim 1, wherein the water stopping device is formed by a water stopping block and a rod connected to the center of the water stopping block and being inserted into the center of the buckling disk.

11. The tea infusing device as claimed in claim 10, wherein the water stopping block has a ball shape.

12. The tea infusing device as claimed in claim 10, wherein the water stopping block has a hemispherical shape.

13. The tea infusing device as claimed in claim 10, wherein the water stopping block has a tapered shape.

14. The tea infusing device as claimed in claim 1, wherein a plurality of convex blocks are formed at the bottom of the protruding ring portion.

15. The tea infusing device as claimed in claim 1, wherein a circular protruding ring portion is installed at the inner wall of protruding ring portion so as to form a lowest point for the buckling disk.

* * * * *